Feb. 8, 1966  G. FRIEDLING ETAL  3,234,384
DIFFERENTIATING AMPLIFIER HAVING A VARIABLE TIME CONSTANT
Filed Aug. 6, 1962

Inventors:
Georges FRIEDLING
Christian VAUX
by: J. Delatre-Seguy
Attorney

United States Patent Office 3,234,384
Patented Feb. 8, 1966

3,234,384
DIFFERENTIATING AMPLIFIER HAVING A
VARIABLE TIME CONSTANT
Georges Friedling, Aix-en-Provence, and Christian Vaux,
Paris, France, assignors to Commissariat a l'Energie
Atomique, Paris, France, a French body corporate
Filed Aug. 6, 1962, Ser. No. 214,926
Claims priority, application France, Aug. 11, 1961,
870,736
6 Claims. (Cl. 250—83.1)

The object of the present invention relates to measuring apparatus of the periodmeter type adapted to supervise the operation of a nuclear reactor, these apparatus being adapted to measure the period T defined by the equation:

$$\frac{1}{T} = \frac{dP}{Pdt}$$

in which:

P is a quantity which is proportional to the neutron flux of a reactor,
$t$ is the time.

A periodmeter comprises, as known per se, a compensated neutron ionization chamber supplying a current to a logarithmic amplifier which supplies an output voltage which is proportional to the logarithm of this current, and a differentiating amplifier which supplies a voltage which is proportional to the derivative with respect to time of the voltage issuing from the logarithmic amplifier.

The invention has for its object a differentiating amplifier which is particularly adapted for use in such a periodmeter.

This differentiating amplifier is characterized in that, while essentially effecting a differentiation, it is arranged to effect also an auxiliary integration adapted to reduce the fluctuations of the output signal, this integration resulting in a response time which is rather great if a satisfactory signal/noise ratio is required, but this response time being continuously and automatically variable both in accordance with the actual period of the reactor and in accordance with the neutron flux, this response time being relatively great when the neutron power is low and relatively small when the neutron power is high and this response time being all the smaller as the period is small.

The invention is in fact based on the principle that:

On the one hand, the statistics of the events occurring in the ionization chamber (the neutron capture) is more unfavourable from the point of view of the fluctations when the neutron flux is low than when it is large; and on the other hand, the integration of the fluctuations can be more energetic when the period of the reactor is great than when it is small, since the evolution of the neutron flux is then less rapid with respect to time and therefore less dangerous.

The amplifier defined hereinbefore permits having a small response time in all the dangerous situations of the reactor (namely short period above all at means and high powers) and a satisfactory signal/noise ratio in all normal situations of the reactor (namely long or medium period); thus the safety systems connected to the periodmeter can act rapidly in the case of danger and the period signal remains nonetheless utilisable in the normal conditions of operation of the reactor owing to the reduction in the fluctuations.

Further features and advantages of the invention will be apparent from the ensuing description, with reference to the accompanying drawing to which the invention is in no way limited.

In the drawing:

FIG. 2 is a diagram of the differentiating amplifier according to the invention.

FIGS. 3 to 5 are diagrams of three modifications of the invention.

Figure 1:
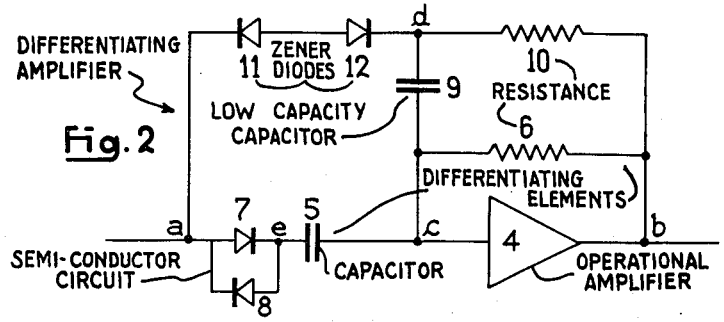
FIG. 1 is a general diagram of a periodmeter.
Figure 1:
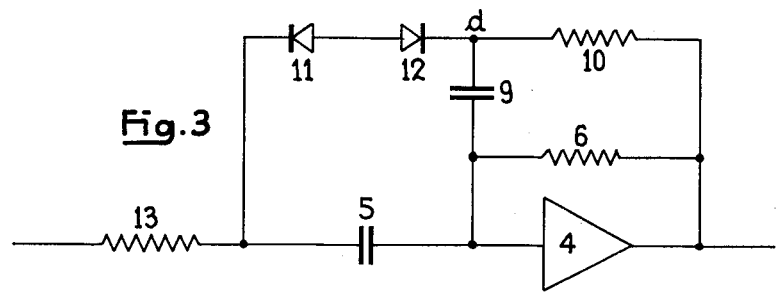
Figure 1:
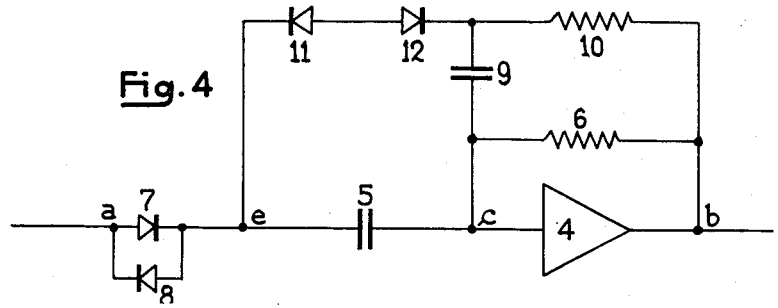
Figure 1:
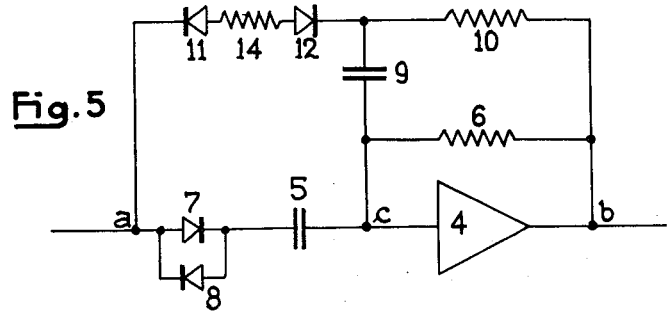
Figure 1:
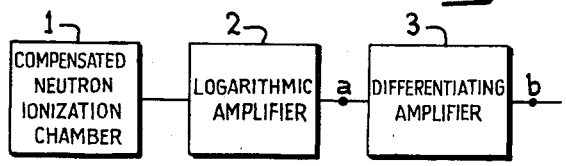

A periodmeter comprises as shown in FIG. 1 an ionization chamber 1, a logarithmic amplifier 2 and a differentiating amplifier 3.

C C P 1 N 5 or C C P 1 N 10 type and is connected to the amplifier 2 to which it supplies a current; this amplifier 2 supplies a voltage which is proportional to the logarithm of this current, which voltage can vary, for example, from 0 to a value $v$ volts of the order of 10 or some tens of volts when the input current varies for example from $10^{-13}$ to $10^{-5}$ amps. This voltage is transmitted to the input $a$ of the differentiating amplifier 3 which supplies at its output $b$ a voltage proportional to the derivative with respect to time of the voltage issuing from the logarithmic amplifier, this differentiating amplifier therefore supplying the aforementioned derivative $dP/Pdt$.

The differentiating amplifier 3 shown in FIG. 2 comprises an operational amplifier 4 and differentiating elements proper 5 and 6 and an auxiliary integration device adapted to minimize the fluctuations.

The operation of the amplifier 4 provides a relatively higher gain, for example 30,000, shifted in phase to the extent $\pi$ between its input $c$ and its output $b$.

The differentiating elements 5 and 6 consist respectively of a capacitor and a resistance.

The auxiliary integration is effected in two ways by two integration circuits, namely:

On the one hand, two diodes having a semi-conductor circuit 7 and 8 mounted in head-to-toe relationship in series with the capacitor 5 constitute with this capacitor a first integration circuit; this integration is solely a function of the period of the nuclear reactor, the dynamic resistance of the diodes being lower as the current passing therethrough is higher and therefore the lower as the variations in the voltage at point $a$ are rapid; and, on the other hand, a capacitor 9 of low capacity relative to the capacitor 5 and the resistance 6 constitute a second integration circuit.

The resistance 6 is connected to the points $b$ and $c$ corresponding to the output and input of the amplifier 4 and at this point $c$ are also connected the capacitor 5 and one of the sides of the capacitor 9 whose other side is connected to a current $d$ of a voltage divider constituted, on the one hand, by a resistance 10 whose other end is connected to the point $b$ and, on the other hand, by two Zener diodes which are connected in series in opposite directions.

This voltage divider has a ratio which is variable in accordance with the difference in potential between the points $a$ and $b$; thus when the voltage $a$ becomes very negative relative to the voltage at $b$, the diode 11 conducts and the diode 12 starts to operate at the Zener rate, the dynamic resistance of the assembly of the diodes 11 and 12 becomes much lower than the resistance 10 and the variations in the potential of $a$; the capacity of the capacitor 9 being negligible relative to that of the capacitor 5, the current injected by the capacitor 9 in the resistance 6 is negligible relative to the current injected by the capacitor 5 so that the mean value of the period signal obtained at $b$ is substantially the same as if the capacitor 9 did not exist.

When on the other hand the voltage at $a$ is but slightly negative relative to the voltage at $b$, the diode 11 conducts and the diode 12 operates at a high dynamic resistance rate, the dynamic resistance of the assembly of the diodes 11 and 12 becomes much higher as the resistance 10 and the variations in the potential of $d$ are near to the variations in the potential of $b$; as concerns the fluctuations, the point $d$ is therefore now isolated from the point $a$ where the fluctuations are moreover low and there is obtained a quasi total feedback loop of the fluctuations through the resistance 10 and the capacitor 9.

The diode 11 permits extending this quasi total feedback characteristic in the case where the voltage at $a$ is positive relative to the voltage at $b$, but in choosing for the diode 11 a Zener diode and not an ordinary diode there is once more obtained a very low feedback rate when the voltage at $a$ is very positive relative to the voltage at $b$.

Thus it is clear that the feedback through the capacitor 9 varies automatically in accordance with the sign and amplitude of the voltage between the points $a$ and $b$. When the power of the reactor increases, the voltage at $a$ is more and more negative, the voltage at $b$ becomes positive and its value is the higher as the power of the reactor evolves rapidly, so that:

With short periods, the feedback through the capacitor 9 becomes low (the response time becomes therefore low as soon as the low power levels are reached);

With medium periods, the response time becomes low for mean power levels;

With long periods, the response time only becomes low for high power levels.

Practical values which could be of utility for carrying out the invention are given hereinafter by way of examples.

The values of the elements are chosen in such manner (but this is not essential) that when the feedback rate through the capacitor 9 is low, the total integration obtained is approximately determined by the elements 5, 7 and 8, whereas when the feedback is quasi total the integration is approximately determined by the elements 6 and 9; in the first case, the response time can be of the order of some tenths of a second and in the second case it can be of the order of several seconds.

*Examples of practical values*

*Logarithmic amplifier.*—Variation in the output voltage for a variation in the input current of $10^{-13}$ to $10^{-5}$ amps=0 to —20 volts namely 0.75 volt per current octave.

*Differentiating amplifier.*—Scale —30, +3 seconds.

Corresponding output voltage: —1, +10 volts. The resistance 10 and the diodes 11 and 12 are such that the ratio between the sum of the dynamic resistances of the diodes and the resistance 10 is much less than unity (for example less than 1%) for a high voltage applied between $a$ and $b$ (for example —15 volts, $a$ being negative with respect to $b$).

Diodes 11 and 12: Zener 14Z4 or 15Z4.
Resistance 10: of the order of 30 to 60K ohms.
Capacitor 5: 0.1 microfarad.
Capacitor 9: 0:01 microfarad.
Resistance 6: 400 megohms.
Diodes 7 and 8: D25.

With these numerical values there is obtained a response time of 90% varying between 10 seconds and 0.2 second and a fluctuation amplitude not exceeding 20% of the corresponding voltage at the end of the scale.

Similar characteristics can also be obtained by replacing the diodes 7 and 8 by a resistance or by connecting the Zener diode 11 not to $a$ but to $e$ which is common to the capacitor 5 and to the diodes 7 and 8, or by effecting these two modifications together: a resistance 14 (FIG. 5) could also be placed between the Zener diodes 11 and 12 so as to maintain the feedback rate above a certain minimum value practically determined in this case by the values of this additional resistance and of the resistance 10; this last form of the application of the invention insures that the humming and other parasite signals which could occur in the amplifier 4 remain sufficiently fedback and do not become troublesome at the output point $b$.

The circuit is rather flexible since a variation in the response time according to a very precise law has not been attempted, but merely a decrease in the response time when the neutronic power increases and when the period of the reactor decreases.

It must be understood that the invention is not intended to be restricted to the embodiment described and shown, or to the described variants, or to the indicated numerical values, these embodiments, variants and numerical values having been given solely by way of examples.

Having now described our invention what we claim as new and desire to secure by Letters Patent is:

1. In a periodmeter for nuclear reactors, of the type comprising a compensated neutron ionization chamber and a logarithmic amplifier; a differentiating amplifier having an input for connection to the logarithmic amplifier and an output; said differentiating amplifier comprising: a first auxiliary integration circuit and an operational amplifier series-connected with one another and connected with said input and output, respectively; said first auxiliary integration circuit comprising first resistant means connected to said input, and a first capacitor series-connected between said first resistant means and said operational amplifier; a first resistor parallel-connected with said operational amplifier; a voltage divider having one end connected between said output and the other end connected with one side of said first resistant means, and comprising two resistant portions series-connected with one another through a common point, the ratio of the resistance values of said two portions being variable according to the potential difference between said two ends; and a second capacitor connected between said common point and the input of said operational amplifier, the capacitance of said second capacitor being less than that of said first capacitor; said first resistor constituting with said first capacitor a differentiating circuit, and, with said second capacitor a second auxiliary integration circuit; the integration obtained by means of the first auxiliary integration circuit being solely a function of the nuclear period.

2. A differentiating amplifier as claimed in claim 1, wherein said first auxiliary integration circuit comprises a group of two diodes connected in head-to-toe relationship in series with said first capacitor, the dynamic resistance of the diodes being lower as the variations in the voltage at the input of the differentiating amplifier are more rapid.

3. A differentiating amplifier as claimed in claim 1, wherein said first portion of said voltage divider is a second resistor, connected to said common point and to the output of the differentiating amplifier, and said second portion comprises a group of two Zener diodes connected in series in opposite directions, said group being connected to said common point and to one side of said resistant means of said first auxiliary integration circuit.

4. A differentiating amplifier according to claim 1, wherein said first resistant means comprise a resistor connected to said input and to said first capacitor, and said other end of the voltage divider is connected to the common point of said resistor and first capacitor.

5. A differentiating amplifier according to claim 2, wherein said other end of said voltage divider is connected to the point which is common to said group of two diodes and to said first capacitor.

6. A differentiating amplifier according to claim 3, wherein said two Zener diodes are connected together through an additional resistor.

References Cited by the Examiner

UNITED STATES PATENTS 2,986,636  5/1961  Carlson et al. _____ 250—83.1
3,069,545  12/1962  Lide _____ 250—83.1

RALPH G. NILSON, *Primary Examiner.*

ARCHIE BORCHELT, *Examiner.*